United States Patent [19]
Baker

[11] Patent Number: 5,983,445
[45] Date of Patent: Nov. 16, 1999

[54] DEBRIS REMOVAL

[75] Inventor: Anthony T Baker, Hull, United Kingdom

[73] Assignee: British Aerospace Public Limited Company, Hampshire, United Kingdom

[21] Appl. No.: 08/923,249

[22] Filed: Sep. 4, 1997

Related U.S. Application Data

[63] Continuation of application No. PCT/GB96/03139, Dec. 18, 1996.

[30] Foreign Application Priority Data

Jan. 4, 1996 [GB] United Kingdom .................... 9600117
Nov. 20, 1996 [GB] United Kingdom .................... 9624061

[51] Int. Cl.$^6$ .................................................. B23Q 11/00
[52] U.S. Cl. ........................ 15/339; 15/415.1; 144/252.1; 408/67
[58] Field of Search ................................. 15/339, 415.1; 144/252.1; 408/67

[56] References Cited

U.S. PATENT DOCUMENTS

| | | | |
|---|---|---|---|
| 2,859,940 | 11/1958 | Brochetti ................................ | 15/339 X |
| 4,184,226 | 1/1980 | Loevenich . | |

FOREIGN PATENT DOCUMENTS

| | | | |
|---|---|---|---|
| 230252 | 11/1963 | Australia ................................ | 15/339 |
| 44386 | 1/1982 | European Pat. Off. ................. | 408/67 |
| 0456598 | 11/1991 | European Pat. Off. . | |
| 2302167 | 9/1976 | France ..................................... | 408/67 |
| 1 431 353 | 4/1976 | United Kingdom . | |
| 2 005 403 | 4/1979 | United Kingdom . | |
| 1 553 411 | 9/1979 | United Kingdom . | |
| 2067106 | 7/1981 | United Kingdom ..................... | 408/67 |
| 1 602 263 | 11/1981 | United Kingdom . | |
| 2 159 619 | 12/1985 | United Kingdom . | |
| 2 257 247 | 1/1993 | United Kingdom . | |
| 2 262 159 | 6/1993 | United Kingdom . | |
| 2 278 190 | 11/1994 | United Kingdom . | |
| WO 9425219 | 11/1994 | WIPO . | |

*Primary Examiner*—Chris K. Moore
*Attorney, Agent, or Firm*—Nixon & Vanderhye P.C.

[57] ABSTRACT

An attachment for use with a vacuum powered debris removal system, said attachment comprising a debris collection bowl, said bowl having a first aperture through which a material cutting tool may be removably inserted, a second aperture through which a vacuum source may be connected, and a third aperture the open circumferential face of which is designed to lie substantially in contact with a material undergoing a cutting operation, such that in use, as debris is generated by the action of the cutting tool on said material, substantially all debris is collected in said bowl and thereby extracted through the second aperture by the action of the vacuum source.

2 Claims, 2 Drawing Sheets

DEBRIS REMOVAL

This is a continuation of PCT application No. PCT/GB96/03139, filed Dec. 18, 1996.

BACKGROUND OF THE INVENTION

1. Field of the Invention

This invention relates to a vacuum cleaning attachment and more specifically but not exclusively to the use of such an attachment for the removal of swarf or debris in drilling and/or grinding operations.

2. Discussion of Prior Art

The use of vacuum cleaning attachments is well known for domestic dust and debris removal, and additionally in manufacturing/industrial applications where large volumes of debris or swarf are required to be moved from the areas surrounding machining operations. The usual method by which industrial swarf or debris is removed relies on specifically shaped vacuum nozzle attachments being placed on or near to the head of a machining or cutting device such that as produced a proportion of the debris can be removed from the area of the work piece. Aside from this industrial machining use the vast majority of vacuum cleaning applications are applied after debris has been produced and allowed to settle either at ground level, on the machine bed or on the work piece itself.

SUMMARY OF THE INVENTION

Our invention allows the removal of substantially all of the debris or swarf produced by the cutting of a material, thereby significantly reducing the time and effort required to apply vacuum cleaning techniques after debris has settled either on or away from a work piece.

According to the present invention there is provided an attachment for use with a vacuum powered debris removal system, said attachment comprising a debris collection bowl, said bowl having a first aperture through which a material cutting tool may be removably inserted, a second aperture through which a vacuum source may be connected, and a third aperture the open circumferential face of which is designed to lie substantially in contact with a material undergoing a cutting operation, such that in use, as debris is generated by the action of the cutting tool on said material, substantially all debris is collected in said bowl and thereby extracted through the second aperture by action of the vacuum source.

BRIEF DESCRIPTION OF THE DRAWINGS

A specific embodiment of the invention will now be described by way of an example with reference to the accompanying drawings in which.

DETAILED DISCUSSION OF PREFERRED EMBODIMENTS

Figure 1:
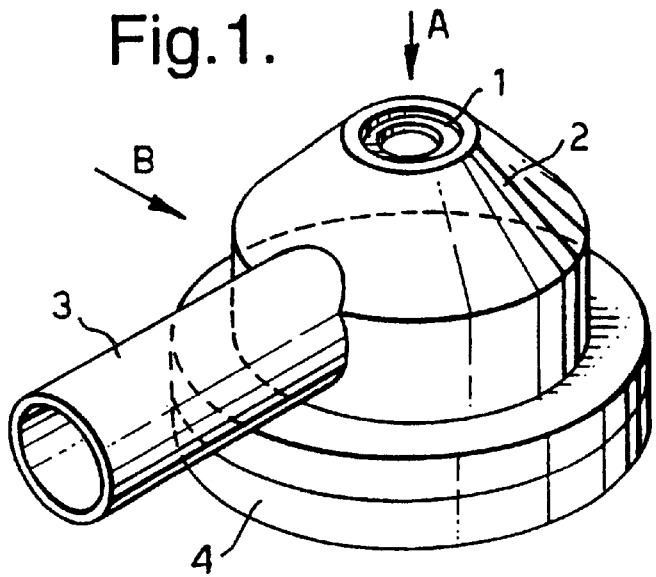
FIGS. 1, 2 and 3 show perspective, top elevation and cross section views respectively of a vacuum attachment in accordance with the invention.
Figure 2:
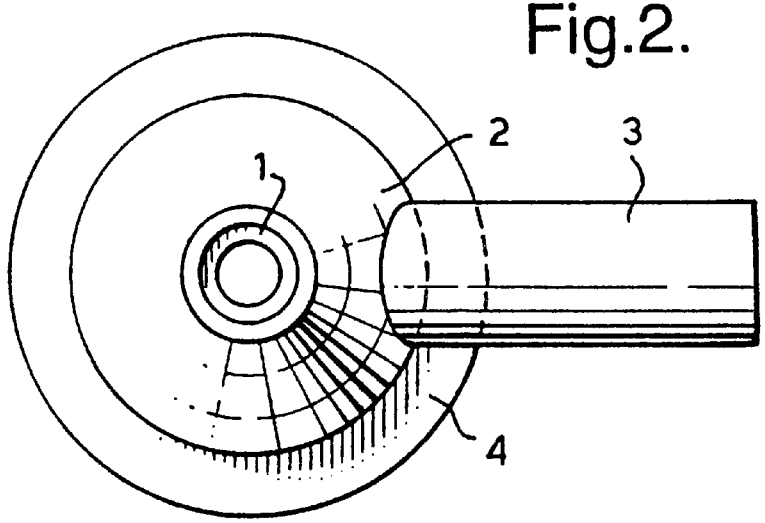
Figure 3:
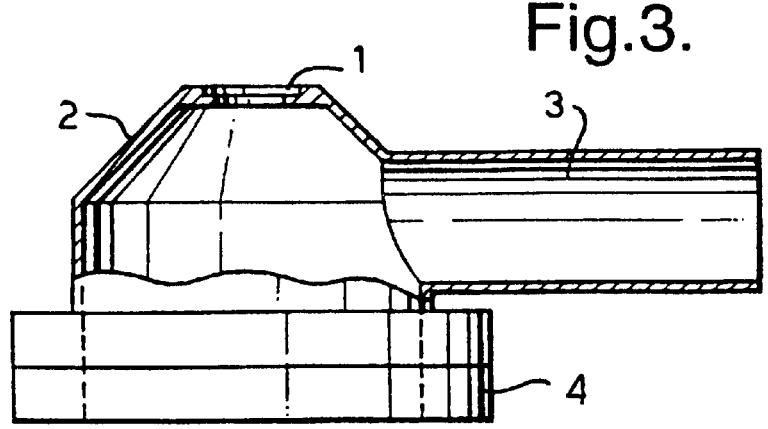

Referring to the drawings, FIGS. 1 to 3 show the transparent body of the vacuum attachment or shell 2 with a first aperture 1 bounded by a steel washer and/or bush, a second aperture 3 providing a releasable attachment position for a vacuum hose (9 shown in FIG. 5) and a seal 4 bounding the circumference of a third aperture to enable adequate suction to be developed within the body of the vacuum attachment 2, hereby holding said attachment to a work piece 8 undergoing the cutting/drilling/machining operation.

FIGS. 2 and 3 show plan and cross sectional view of the vacuum attachment respectively.

Figure 4:
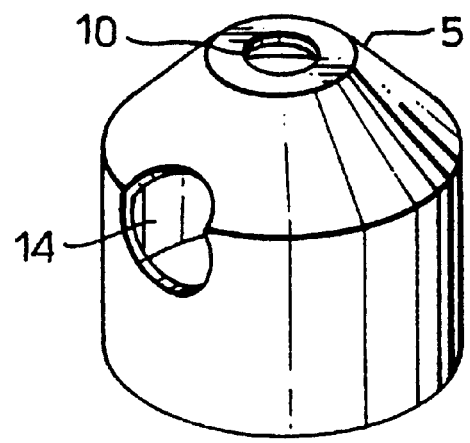
FIG. 4 shows a perspective view of an insert.

FIG. 4 shows an insert 5 designed to fit inside the body of the vacuum attachment 2, having a first aperture 10 which corresponds to the position of the first aperture 1 in the main body of the vacuum attachment 2, and a second aperture 14 which corresponds to the position of the vacuum aperture 3 in the body of the vacuum attachment 2, thereby allowing the respective insertion of a drill bit or tool 6 and providing a passage for the vacuum source (not shown) to reach debris in the body of the vacuum attachment 2.

Figure 5:
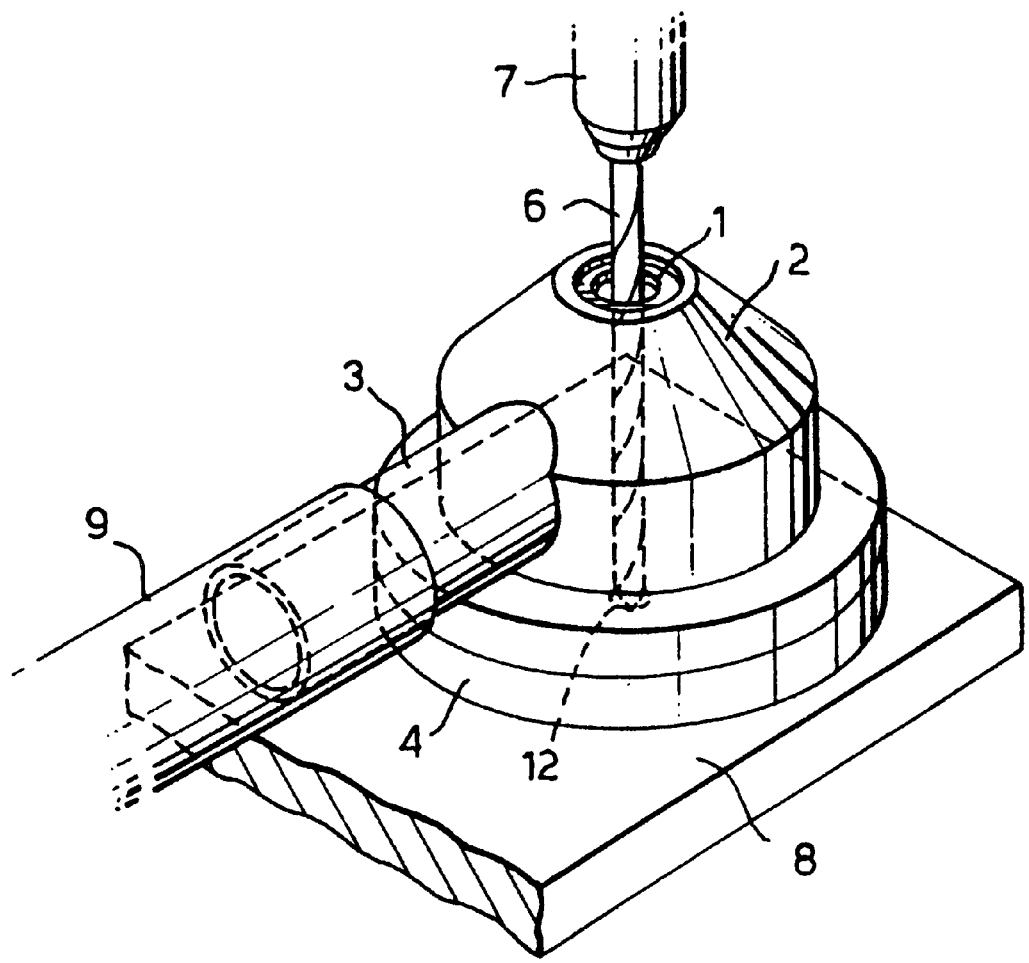
FIG. 5 shows a diagrammatic representation of a vacuum attachment in accordance with the invention in situ on a work piece.

FIG. 5 shows the vacuum attachment 2 in position on a work piece 8, having a vacuum source connected by a releasably attachable pipe 9 to a channel or pipe leading to the aperture 3 in the main body of the vacuum attachment 2. When vacuum suction is applied to the pipe 9 the attachment 2 is held onto the work piece 8 by the force of said vacuum, and the seal 4 serves to substantially remove the possibility of leakage of air into the inner bowl 2. A plastic insert 5 is positioned within this inner bowl 2 is located such that the apertures 1 and 10 are coincident, thereby providing a path for the drill bit 6 to contact the work piece 8 at the required position 12. As the drill bit 6, powered by the drill 7 begins to cut into the work piece 8, swarf and debris will be produced, which, due to the applied vacuum, will be drawn through the aperture 3 and into the vacuum source pipe 9. The insert 5 serves to prevent damage to the inner surface of the transparent vacuum attachment bowl 2, thereby allowing adequate visibility of the cutting operation at the point of contact 12 on the work piece 8.

The dimensions of the vacuum attachment bowl, 2 the aperture 1 and the work face aperture surrounded by the sealing ring 4 may be varied to suit any size of drill bit 6, or indeed any other form of cutting bit which produces swarf or debris and could be introduced through an aperture 1 to its required point of contact 12 on a work piece 8. The provision of the sealing ring 4 enables sufficient suction to be developed within the vacuum attachment 2 such that the said attachment will adhere to the work surface 8 during the cutting process but can be easily removed subsequently by its operator. There may be applications in which full contact of this sealing ring 4 may not be possible due to the location of the required drilling position 12 being, for example, at an edge, in which case sufficient suction would be made available to remove substantially all debris and swarf thereby causing only a small reduction in the effectiveness of the apparatus.

Materials which could be utilised for the manufacture of such vacuum attachments include transparent plastics such as polycarbonates. The bearing surface surrounding the aperture 1 would ideally be metallic to enable adequate protection of the bowl material 2, a suitable material being hardened steel.

I claim:

1. An attachment for use with a vacuum powered debris removal system, said attachment comprising a transparent debris collection bowl, said bowl having a first aperture bounded by a bearing surface through which a material cutting tool may be removably inserted, a second aperture to which a vacuum source may be connected, and a third aperture having an open circumferential face adapted to lie substantially in contact with a material undergoing a cutting operation, and said attachment further comprising a replaceable transparent insert removably housed within said debris collection bowl, said insert having three apertures corresponding respectively to said first, second and third apertures in the debris collection bowl.

2. An attachment for use with a vacuum powered debris removal system as claimed in claim 1, wherein the bearing surface of said aperture in the debris collection bowl is substantially metallic.

\* \* \* \* \*